United States Patent
Hess et al.

(10) Patent No.: US 6,755,436 B2
(45) Date of Patent: Jun. 29, 2004

(54) APPARATUS AND METHOD FOR AIRBAG INFLATION GAS DISTRIBUTION

(75) Inventors: Travis B. Hess, Farr West, UT (US); Kurt E. Kottke, Bountiful, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/892,388

(22) Filed: Jun. 26, 2001

(65) Prior Publication Data

US 2002/0195804 A1 Dec. 26, 2002

(51) Int. Cl.[7] ............................................. B60R 21/22
(52) U.S. Cl. ................... 280/730.2; 280/740; 280/742; 280/743.1
(58) Field of Search ............................. 280/729, 730.2, 280/743.1, 742, 740

(56) References Cited

U.S. PATENT DOCUMENTS

| | | | | |
|---|---|---|---|---|
| 5,899,486 | A | * | 5/1999 | Ibe ........................... 280/728.2 |
| 6,199,898 | B1 | * | 3/2001 | Masuda et al. .......... 280/730.2 |
| 6,237,943 | B1 | | 5/2001 | Brown et al. |
| 6,325,409 | B1 | * | 12/2001 | Fischer .................... 280/730.2 |
| 6,334,625 | B1 | * | 1/2002 | Pausch et al. ............. 280/729 |
| 6,386,581 | B1 | * | 5/2002 | Ohno ........................ 280/735 |
| 6,409,211 | B1 | * | 6/2002 | Sheng et al. ............ 280/730.2 |
| 6,435,553 | B1 | * | 8/2002 | Wipasuramonton et al. ....................... 280/743.1 |
| 6,460,879 | B2 | * | 10/2002 | Tanase et al. ............ 280/730.2 |
| 6,471,240 | B2 | * | 10/2002 | Bakhsh et al. ............... 280/729 |
| 6,502,853 | B2 | * | 1/2003 | Keshavaraj .................. 280/729 |
| 6,502,857 | B2 | * | 1/2003 | Nakanishi et al. .......... 280/740 |

FOREIGN PATENT DOCUMENTS

| | | |
|---|---|---|
| DE | 29914637 | 1/2000 |
| GB | 2314300 A | 12/1997 |

\* cited by examiner

Primary Examiner—Eric Culbreth
Assistant Examiner—Toan C To
(74) Attorney, Agent, or Firm—Sally J. Brown

(57) ABSTRACT

The present invention provides a system and method for distributing inflation gases within an airbag cushion. Such a cushion may have one or more protection zones configured to inflate to protect vehicle occupants. An inflation channel maybe enclosed by one or more of the protection zones, and may be attached to a mounting surface within a protection zone. The inflation channel may be connected to an inflator, and may have a plurality of holes along its length, sized or spaced apart in a manner selected to provide a comparatively even flow rate of inflation gas to all parts of the cushion during inflation. Additionally, the inflation channel may have a gas outlet extension along which the holes are disposed; the gas outlet extension may have a tapered shape configured to collapse under external pressure to prevent backflow of inflation gases into the inflation channel. The inflation channel may be easily manufactured in a number of ways, including extrusion of a polymeric workpiece with a slit along its length. The slit may be intermittently closed to form the gas outlet extension with the holes, without the need for punching or drilling.

41 Claims, 5 Drawing Sheets

APPARATUS AND METHOD FOR AIRBAG INFLATION GAS DISTRIBUTION

BACKGROUND OF THE INVENTION

1. The Field of the Invention

The present invention relates to vehicular safety. More specifically, the present invention relates to a novel apparatus and method for distributing inflation gases in a cushion for an inflatable curtain module.

2. The Relevant Technology

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the ignition of an explosive charge. Expanding gases from the charge fill the airbags, which immediately inflate in front of the driver and passenger to protect them from impact against the windshield. Side impact airbags, known as inflatable curtains, have also been developed in response to the need for similar protection from impacts in a lateral direction, or against the side of the vehicle.

However, despite their enormous lifesaving potential, the effectiveness of side impact airbags has been somewhat limited by the speed with which inflation gases are able to fill the cushion. Side impact cushions are often designed to unfold or unroll downward to inflate beside a person to keep the person from hitting the door or window during lateral impact. Since a vehicle occupant may be leaning forward, reclined in the seat, or at any position between, such cushions are often made somewhat long to ensure that the occupant hits the cushion.

Cushions for inflatable curtains are often inflated by an inflator positioned either fore or aft of the cushion. Consequently, unlike many front impact airbags, a long gas flow path exists between the inflator and the outermost extent of the cushion. The length of the gas flow path is problematic for a number of reasons.

One such reason is that the cushions are unable to inflate rapidly enough to provide optimal protection. Since most airbag systems are unable to detect a collision until impact has begun to occur, the airbag must move from an uninflated, stowed configuration to a fully inflated configuration within a small fraction of a second. The long flow path increases the time required by the inflation gases to traverse the cushion. Thus, the cushion may not obtain a fully inflated state before the vehicle occupant strikes the cushion.

In an attempt to compensate for the longer gas flow path, inflators with a higher "rise rate," or rate of pressure increase of expelled gases, and a higher volume of expelled gases, have been used. Unfortunately, when the inflation gases are more highly pressurized, there is a higher danger of damage to the cushion. Highly-pressurized gases produce stresses in the material of the cushion that may tend to rip the cushion material or split the cushion open along the seams, thereby jeopardizing the effectiveness of the cushion.

Furthermore, even when the inflator produces a larger amount of gas, the inflation gas may expand in the portion of the cushion nearest to the inflator, rather than continuing toward the furthest extents of the cushion. As a result, the cushion may not be uniformly inflated in time to shield occupants properly from impact.

Existing airbag configurations developed in an attempt to solve this problem also have some drawbacks. Some are difficult and/or expensive to manufacture, in part due to additional drilling, punching, aligning, fixturing and the like that must be carried out. Some increase the expense of airbag installation because they have parts that must be inserted into a finished cushion prior to installation of the cushion in a vehicle. Others require additional time to reach a steady state after inflation due to backflow and other continued motion of inflation gases within the cushion.

Accordingly, a need exists for an apparatus and method for distributing inflation gases in an inflatable cushion in a comparatively uniform and rapid manner. A need further exists for such an apparatus and method that can be carried out with a minimum of added expense to the manufacture and installation of the cushion. Furthermore, a need exists for such an apparatus and method that is capable of stabilizing the location of inflation gases when the cushion has been fully inflated.

BRIEF SUMMARY OF THE INVENTION

The apparatus and method of the present invention have been developed in response to the present state of the art, and in particular, in response to the problems and needs in the art that have not yet been fully solved by currently available airbag component attachment systems and methods. Thus, it is an overall purpose of the present invention to provide an apparatus and method for distributing inflation gas within an airbag cushion with a high degree of inflation speed and uniformity, manufacturing and installation economy, and inflation stability An inflatable curtain module according to the present invention may have an inflatable cushion configured to activate to shield a vehicle occupant from impact against a lateral surface of the vehicle, such as a door or window. The cushion preferably has at least one protection zone, and may optionally have multiple protection zones, each of which may serve to protect one occupant. Thus, a single cushion may, for example, cover a rear door or surface as well as a front door, so that an occupant of a back seat can be protected as well as an occupant of a front seat. The protection zones may be connected by a connection zone configured to convey tension and inflation gas between the protection zones.

The cushion may have a first membrane and a second membrane, each of which has an interior portion and an outer edge substantially surrounding the interior portion. The first membrane may also have a mounting surface disposed within the interior portion of the first membrane, and running along a portion of the length of the interior portion. The first and second membranes may be attached at the outer edges such that the interior portions face each other to form the one or more protection zones of the cushion. Each protection zone may be divided into a number of chambers, which may, for example, be oriented substantially upright.

The membranes may be attached in a number of different ways, including sewing, RF welding, chemical or adhesive bonding, or the like. The chambers maybe separated from each other through the use of a similar method, or through the use of an entirely different attachment process.

An inflation channel may be disposed along a portion of the length of the cushion, and may be attached to the mounting surface of the first membrane such that the inflation channel is affixed within one or more protection zones of the cushion. The inflation channel may be coupled to receive inflation gas from an inflator by, for example, connecting a gas guide to the inflator and to the inflation channel. The inflation channel may have a plurality of holes disposed along its length, for distributing inflation gases throughout the cushion.

The inflation channel may have a conduit shaped to convey inflation gas. Additionally, the inflation channel may have a mounting flap configured to be affixed to the mounting surface of the first membrane. The inflation channel may operate to receive and dissipate the initial shock of the expanding, heated inflation gas, thereby preventing damage to the membranes of the cushion. Furthermore, the inflation channel may be designed such that inflation gases are able to freely exit the inflation channel through the holes, but are unable to re-enter as freely.

For example, a gas outlet extension may run along the length of the conduit; the gas outlet may have a substantially tapered shape with an enlarged end toward the conduit and a narrow end away from the conduit. The holes may be formed in the narrow end. Consequently, when the pressure within the conduit is greater than the pressure outside the conduit, the enlarged end remains open and in fluid communication with the conduit. However, when the pressure outside the conduit becomes larger than that within the conduit, the gas outlet extension is compressed to close the holes and limit fluid communication between the conduit and the gas outlet extension. Consequently, backflow of inflation gases into the inflation channel may be limited, and the pressure within the cushion may therefore be comparatively stable directly after inflation.

Attachment of the mounting flap to the mounting surface maybe carried out through any of the attachment methods mentioned above. In order to attach the mounting flap through RF welding, the inflation channel may be constructed of a urethane-based material, or may be constructed of a fabric and coated with urethane at the mounting flap. The mounting surface may similarly be coated with a urethane-based material so that the mounting flap can be RF welded to the mounting surface.

The holes may be strategically positioned and sized to control the flow of inflation gases into each portion of the cushion. More specifically, the holes may be sized or spaced apart in a variable fashion so that the cushion inflates substantially uniformly along its length. For example, the holes may be made comparatively smaller toward the point of entry of inflation gas, and may become larger further into the cushion. Thus, gas flow into the portions of the cushion nearest to the inflator is limited by the flow restriction imposed by the smaller holes. Flow into the portions further from the inflator is less restricted to compensate for the fact that inflation gases must travel a greater distance to reach those portions of the cushion.

Alternatively, the holes maybe spaced apart in a variable fashion, so that the holes are comparatively far apart close to the point of entry of the inflation gas, and comparatively close together further from the point of entry. The holes may then be of a uniform size. The existence of a larger number of holes decreases the flow restriction imposed on inflation gases moving into the portions of the cushion that are further from the point of entry.

The inflation channel may be easily manufactured in a number of ways. For example, the inflation channel maybe extruded from a urethane-based material in the desired shape. The gas outlet extension may be formed fully closed, and selectively opened to provide the holes. In the alternative, the inflation channel may be formed form a workpiece with a slit along the length of the workpiece. Sections of the slit may be selected for use as holes; the slit may then be closed by attaching attachment surfaces of the slit exclusively between the selected sections. The inflation channel may also be formed from a fabric, using conventional fabric shaping and/or attachment methods.

Through the system and method of the present invention, a cushion may receive a more uniform airflow, directed comparatively evenly into all parts of the cushion. Furthermore, inflation stress may be absorbed without risking damage to the cushion. Yet further, continued motion of inflation gases after the cushion has been filled may be restricted through the use of a backflow preventative inflation channel shape. Yet further, such benefits, and more besides, may be obtained without adding greatly to the overall manufacturing or installation cost for the inflatable curtain module.

These and other objects, features, and advantages of the present invention will become more fully apparent from the following description and appended claims, or maybe learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

The present invention utilizes principles of compressible fluid flow to control the distribution of inflation gases within a cushion. The speed with which a compressible fluid enters a volume increases with the pressure differential tending to push the fluid into the volume as well as the cross sectional area through which the compressible fluid must travel to enter the volume. In the absence of any blockage, a compressible fluid under pressure will generally travel outward in all directions.

At the point of entry of inflation gases entering an inflatable cushion, the inflation gases have several different directions in which they can expand. With no guiding features within the airbag, a large portion of the inflation gases will move into the portion of the cushion directly adjoining the point of entry. If the cushion has chambers, those chambers closest to the inlet will initially receive the greater portion of the inlet gases. A comparatively smaller portion will reach the chambers further from the inlet. This problem can be even greater for cushions having multiple protection zones; the protection zones are connected by a comparatively narrow passageway, through which a comparatively small portion of the inflation gases will initially travel to reach the protection zone furthest from the inlet.

The present invention provides a system and method by which the mass flow rate of inflation gas into each portion of the cushion can be controlled. A system of flow restrictions, in the form of an inflation channel with a plurality of holes along its length, may be designed to permit selection of the cross sectional area through which the inflation gases must travel to reach each portion of the cushion. Thus, the flow of inflation gases can be channeled and restricted to provide comparatively uniform inflation of the cushion. These principles will be shown and described in greater detail in conjunction with the following description and the accompanying figures.

Figure 1:
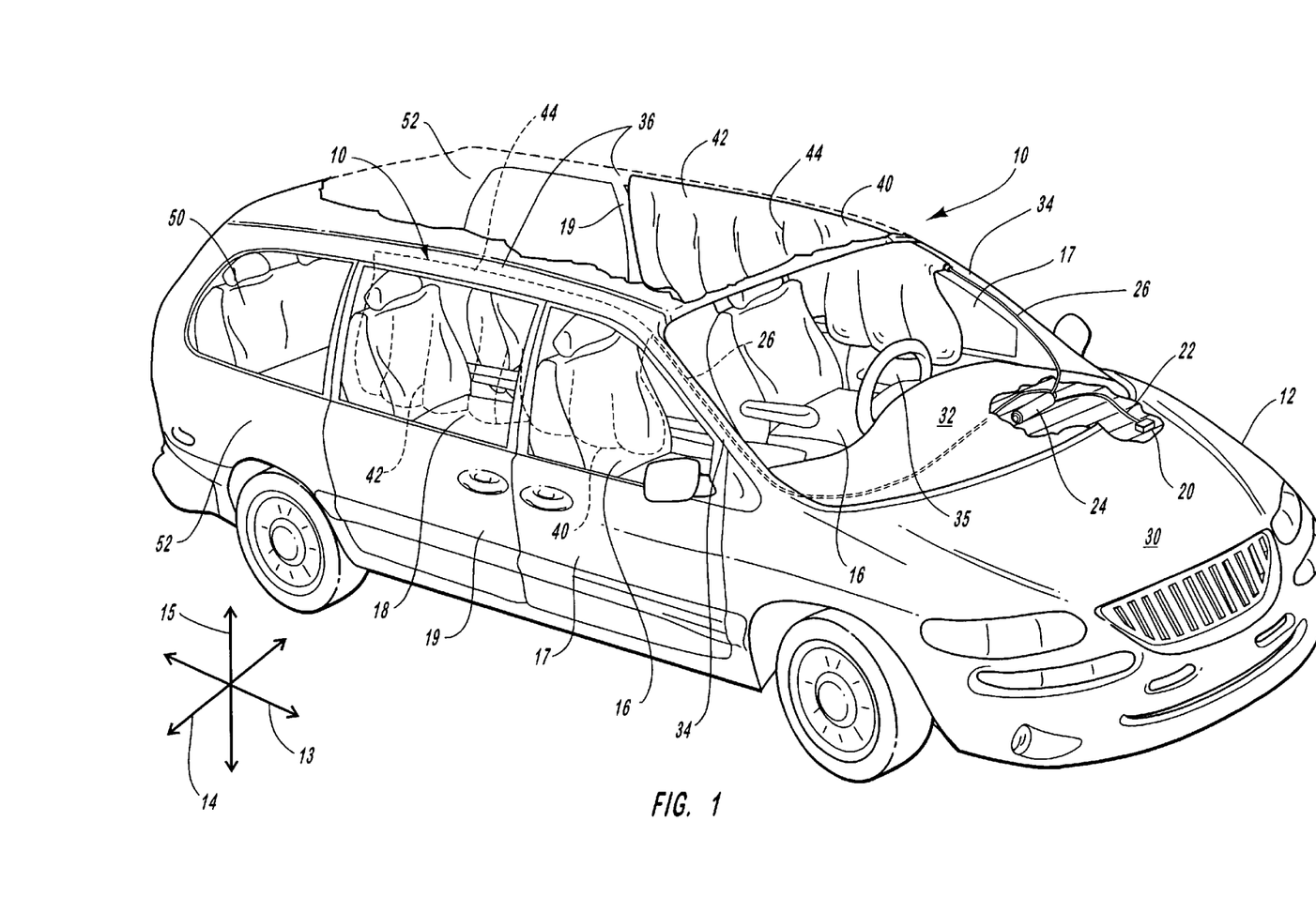
FIG. 1 is a perspective view of a vehicle incorporating one embodiment of a dual protection zone, inflatable cushion according to the invention.

Referring to FIG. 1, two cushions 10 according to one possible embodiment the invention are shown installed in a vehicle 12. The cushions 10 may each form part of an inflatable curtain module, or an airbag system configured to protect vehicle occupants against lateral impact. The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted.

One or more accelerometers 20 or other similar impact sensing devices detect sudden lateral acceleration (or deceleration) of the vehicle 12 and transmit electric signals via electric lines 22 to one or more sources 24 of pressurized gas, or inflators 24. FIG. 1 shows only one inflator 24 configured to inflate both cushions 10.

The inflator 24 may take the form of a hollow pressure vessel containing a chemically reactive material and/or compressed gas that can be activated or released upon application of electricity to provide an outflow of inflation gases. Each cushion 10 may have a gas guide 26 to convey the inflation gases from the inflator 24 to the cushion 10. The inflator 24 may operate with such rapidity that, before the vehicle 12 has fully reacted to the impact, the cushions 10 have inflated to protect vehicle occupants from impact.

The accelerometers 20 and inflators 24 may be stowed within an engine compartment 30 or dashboard 32 of the vehicle 12, as shown in FIG. 1. In such a configuration, each of the gas guides 26 is disposed along one of the A pillars 34 of the vehicle 12 to reach the cushions 10. In the alternative, each cushion 10 may have its own accelerometer 20 and inflator 24 positioned directly fore or aft of the cushion 10. For example, the inflators 24 and accelerometers 20 may be disposed along roof rails 36 of the vehicle 12 in back of the cushions 10, or along the A pillars 34 in front of the cushions 10. In such a case, shorter gas guides 26 may be used to convey inflation gases to the cushions 10.

As depicted in FIG. 1, each of the cushions 10 is installed along one of the roof rails 36. The cushions 10 shown in FIG. 1 are configured to protect not only occupants of the front seats 16, but those of the rear seats 18 as well. Thus, each cushion 10 may have a first protection zone 40 configured to inflate between the front seats 16 and one of the front doors 17, and a second protection zone 42 configured to inflate between the rear seats 18 and one of the rear doors 19.

The first and second protection zones 40, 42 of each cushion 10 may be attached together through the use of a connection zone 44 between the protection zones. The connection zones 44 preferably have passageways to convey inflation gases between the first and second protection zones 40, 42. The connection zones 44 may be longitudinally positioned between the front seats 16 and the rear seats 18; consequently, the connection zones 44 need not be configured to provide impact protection for occupants of the vehicle 12. Each cushion 10 may have one or more tethers or similar anchoring devices (not shown) attached to the roof rail 36, the A pillar 34, and/or other components of the vehicle 12 to exert tension on the cushions 10 to keep them in place during inflation and impact.

Although each cushion 10 in FIG. 1 has two protection zones 40, 42, the invention encompasses the use of cushions with any number of protection zones. Thus, if desired, the protection zones 42 and connection zones 44 may be omitted to leave only the protection zones 40. Alternatively, each of the cushions 10 may be extended to have one or more protection zones positioned to protect occupants of extra seats 50 behind the rear seats 18 from impact against third lateral surfaces 52 of the vehicle 12.

The cushions 10 each have a considerable length in the longitudinal direction 13, particularly in embodiments such as that of FIG. 1, in which each cushion 10 has multiple protection zones 40, 42. If each cushion 10 is only fed by a single inflator, as shown in FIG. 1, the result is that inflation gases must travel a considerable distance to traverse the cushion 10. With continued reference to the exemplary embodiment of FIG. 1, the present invention provides a method and apparatus whereby the protection zones 40, 42 can be substantially uniformly inflated, despite the fact that inflation gases only inflate the second protection zones 42 after traveling through the first protection zones 40 and the connection zones 44.

"Substantially uniform" inflation need not be precisely simultaneous inflation of the first and second protection zones 40, 42. Rather, substantially uniform inflation simply requires that the difference in inflation times between the protection zones 40, 42 is small enough that both protection zones 40, 42 deploy in time to provide impact protection. "Substantially uniform inflation along the length of the cushion 10" will be understood to exclude portions of the cushion 10 that do not provide significant protection for vehicle occupants, such as the connection zone 44. The manner in which the cushions 10 are configured to provide more uniform inflation will be further illustrated and described in connection with FIG. 2.

Figure 2:
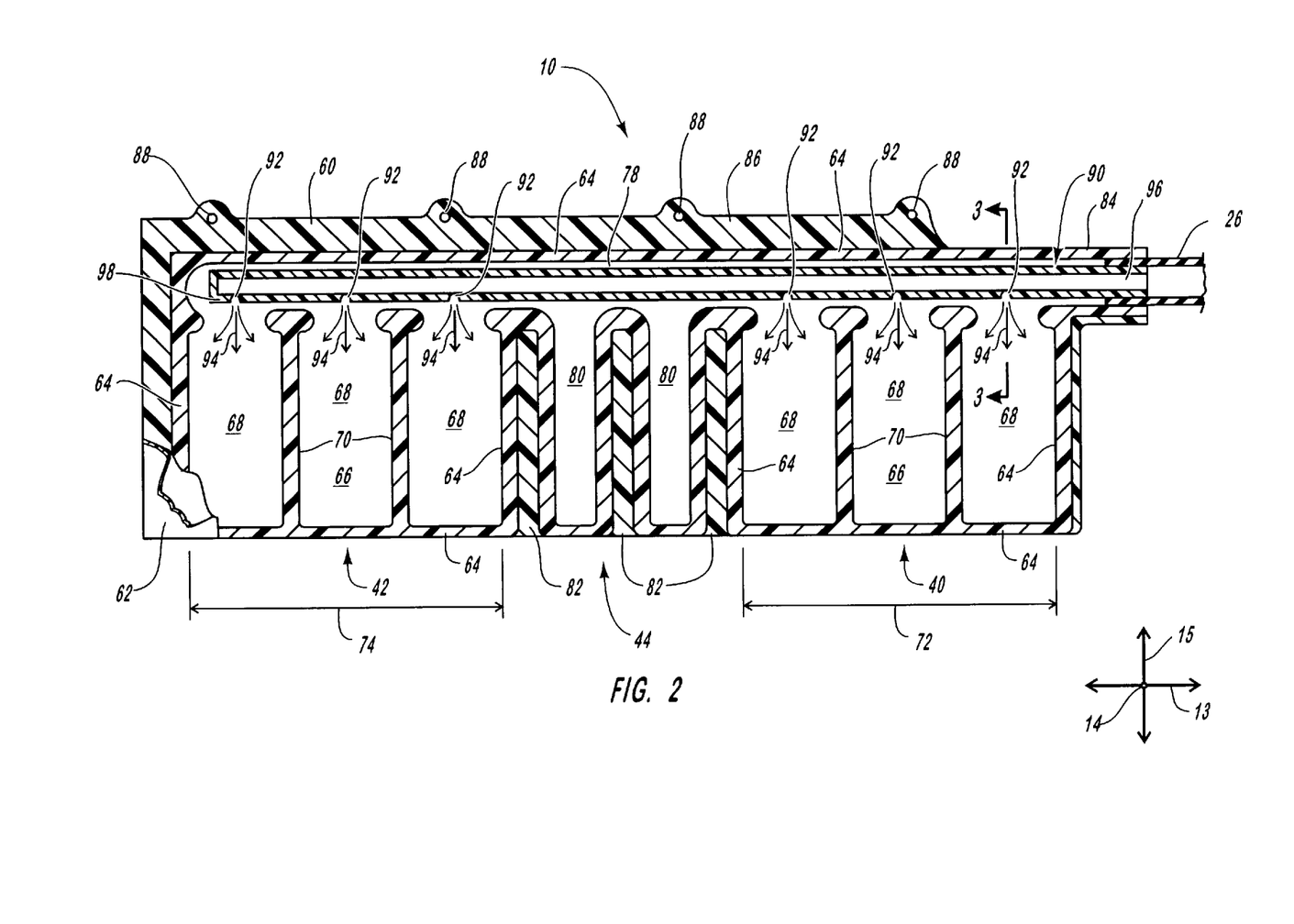
FIG. 2 is a side elevation, section view of the cushion of FIG. 1, with an inflation channel disposed along the length of both protection zones of the cushion.

Referring to FIG. 2, a side elevation, section view of one of the cushions 10 of FIG. 1 is depicted. The cushion 10 maybe produced using "lay flat" construction, in which the cushion 10 is constructed largely of flat, symmetrical elements affixed together. The cushion 10 may, for example, have a first membrane 60 and a second, similarly shaped membrane 62, only a portion of which is shown in FIG. 2. The first and second membranes 60, 62 may be formed from flexible, substantially gas-impermeable material, such as fabrics. Each of the membranes 60, 62 may have an outer edge 64 extending generally around a circumference of the membrane 60, 62. The outer edges 64 of the membranes 60, 62 may substantially encircle an interior portion 66 for each of the protection zones 40, 42.

The interior portion 66 of each of the protection zones 40, 42 may be divided into a plurality of chambers 68, each of which is oriented substantially upright. The chambers 68 of each protection zone 40, 42 may be divided from each other through the use of chamber dividers 70, which may take the form of interior seams 70 formed by attaching the first and second membranes 60, 62 together between the chambers 68 through sewing, bonding, RF welding, or the like. Extra fabric seams, polymer coatings, or the like may be used to form the interior seams 70 with the selected attachment method.

As mentioned previously, the cushion 10 may be manufactured through lay flat construction. According to lay flat construction, the first and second membranes 60,62 may be made separately of a flexible material such as a fabric, and laid together, one on top of the other. In the alternative, the first and second membranes 60, 62 may be portions of a single piece of fabric folded together; the present invention contemplates both unitary and separate membranes 60, 62.

After the membranes 60, 62 have been properly aligned, the outer edges 64 of the first and second membranes 60, 62 may be attached together to effectively enclose the interior portions 66, aside from space for inflation gas inlet. Each interior portion 66 then forms a protection zone 40, 42 capable of holding inflation gas, as least for a period of time sufficient to provide impact protection.

The outer edges 64 maybe attached through the use of a first attachment mechanism, which may be any attachment mechanism suitable for attaching two flexible portions of material together. For example, the first attachment mechanism may comprise mechanical fastening, sewing, weaving, chemical or adhesive bonding, thermal, sonic, or electromagnetic welding, or the like. For example, "one piece woven" technology may be utilized to affix the membranes 60, 62 together through the use of fibers from one or both of the membranes 60, 62.

Alternatively, RF welding may be utilized to affix the membranes 60, 62 through the application of radio frequency electromagnetic radiation. RF welding works exceptionally well with urethane-based materials (materials having a significant urethane content); thus, if RF welding is used, the first and second membranes 60, 62 maybe either constructed of or coated with a urethane-based substance.

The first protection zone 40 may have a length 72 defined as the length of the interior portion 66 of the first protection zone 40 in the longitudinal direction 13. Similarly, the second protection zone 42 may have a length 74 defined as the length of the interior portion 66 of the second protection zone 42 in the longitudinal direction 13.

The connection zone 44 may be configured to permit communication of inflation gases between the first and second protection zones 40, 42 through the use of a transfer port 78 extending between the protection zones 40, 42. The transfer port 78 may be in communication with one or more connection chambers 80 configured to receive a comparatively small portion of the inflation gases.

As mentioned previously, due to the positioning of the connection zone 44 after inflation, the connection zone 44 need not provide impact protection. Thus, the connection chambers 80 need not be sized and shaped to effectively protect vehicle occupants. Rather, the upright orientation and elongated shape of the connection chambers 80 tends to shorten the connection zone 44, and thus, the cushion 10 as a whole, in the longitudinal direction 13 when the connection chambers 80 inflate.

The connection chambers 80 may be connected together and connected to the first and second protection zones 40, 42 through the use of flexible portions 82 of the connection zone 44. The flexible portions 82 may simply be expanses of fabric capable of transmitting tension between the connection chambers 80, the first protection zone 40, and the second protection zone 42. The chambers 68 of the protection zones 40, 42 may have a similar longitudinal shortening effect upon inflation. The overall longitudinal shortening of the cushion 10 adds to the tension exerted against the inflated cushion 10; such tension helps to keep the inflated cushion 10 properly positioned during impact.

The cushion 10 may have an inflation port 84, through which the cushion 10 receives inflation gases from the gas guide 26. In the alternative, the inflator 24 may be disposed directly within the inflation port 84, so that no gas guide 26 is necessary. Furthermore, the cushion 10 may have a vehicle attachment flap 86, by which the cushion 10 can be installed in the vehicle 12. The vehicle attachment flap 86 may have a plurality of holes 88 distributed along its length so that fasteners such as bolts, nuts, rivets, flexible plastic parts, or the like can be used to affix the vehicle attachment flap 86 to the roof rail 36.

An inflation channel 90 may be positioned in the inflation port 84, and may extend substantially along the length 72 of the first protection zone 40. Since the cushion 10 shown in FIG. 2 also has a second protection zone 42, the inflation channel 90 may also extend through the transfer port 78 and substantially along the length 74 of the second protection zone 42.

The inflation channel 90 may have a plurality of holes 92 through which inflation gases can escape from the inflation channel 90 to fill the first and second protection zones 40, 42. As shown, each hole 92 is positioned adjacent to one of the chambers 68. Such a configuration may expedite inflation by providing a comparatively direct path for gas flows to enter the chambers 68. The connection chambers 80 require a comparatively smaller amount of inflation gas, and therefore need not have a hole 92 positioned adjacent to them. The configuration of FIG. 2 is only one possible way in which the holes 92 can be positioned; the holes 92 may be located at any position along the length of the inflation channel 90.

The inflation channel 90 may have a proximal end 96 positioned within the inflation port 84 and a distal end 98 positioned near the end of the second protection zone 42. The proximal end 96 may be attached to the gas guide 26 in a variety of ways. For example, the gas guide 26 may be sandwiched between the proximal end 96 of the inflation channel 90 and the inflation port 84 by positioning the proximal end 96 within the gas guide 26, and then positioning the end of the gas guide 26 within the inflation port 84.

The proximal end 96, the inflation port 84, and the gas guide 26 may then all be fixed relative to each other and sealed in a number of different ways, including mechanical fastening, chemical or adhesive bonding, thermal, sonic, or electromagnetic welding, sewing, and weaving. For example, a clamp, clip, or other mechanical device (not shown) may be used to press the proximal end 96, the inflation port 84, and the gas guide 26 together. A spacer ring (not shown) constructed of a comparatively stiff material may be positioned within the proximal end 96 to ensure that the proximal end 96 remains open to receive inflation gases.

Alternatively, the proximal end 96, the inflation port 84, and/or the gas guide 26 may be constructed of or coated with a urethane-based material so that RF welding can be applied to seal the gas guide 26 and the proximal end 96 in place relative to the inflation port 84. As mentioned previously, in place of the gas guide 26, a portion of the inflator 24 may be positioned directly within the inflation port 84. In such a configuration, the proximal end 96 may be sealed around the inflator with some type of mechanism, including the types mentioned previously.

The distal end 98 of the inflation channel 90 may be sealed shut, if desired. Alternatively, the distal end 98 may be left open to permit additional inflation gases to flow into the end of the second protection zone 42. The distal end 98 may be enlarged or narrowed to control the size of such an opening. If desired, the inflation channel 90 may be tapered somewhat along its entire length to become either narrower or larger toward the distal end 98. Such tapering may provide additional control over the resistance to inflation gas flow at any point along the length of the inflation channel 90. The configuration and operation of the inflation channel 90 will be shown and described in greater detail in connection with FIG. 3.

Figure 3:
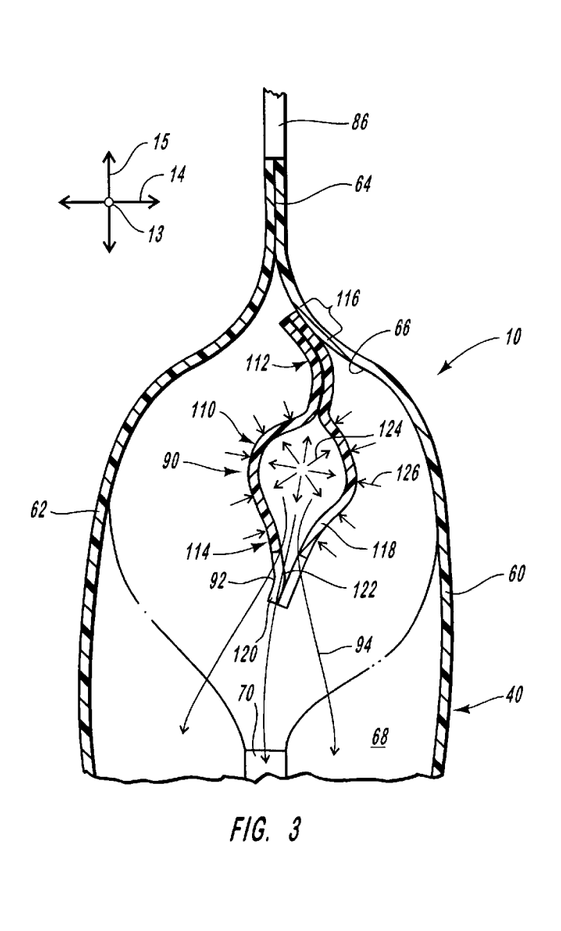
FIG. 3 is a front elevation, section view of the cushion of FIG. 1, showing the inflation channel during inflation of the cushion, in which pressure within the inflation channel is greater than pressure outside the channel so that inflation gas may freely flow from the gas outlet extension.

Referring to FIG. 3, a front elevation, section view of the cushion 10 is shown, depicting the inflation channel 90 during inflation of the cushion 10. The inflation channel 90 may have a conduit 110, which may have a somewhat circular shape conducive to relatively free flow of inflation gas. The inflation channel 90 may also have a mounting flap 112, with which the inflation channel 90 may be affixed to the interior portion 66 of the first membrane 60. Additionally, the inflation channel 90 may have a gas outlet extension 114 in fluid communication with the conduit 110 such that inflation gases can exit the conduit 110 via the gas outlet extension 114. The holes 92 may thus be positioned in the gas outlet extension 114.

The mounting flap 112 may be attached to a mounting surface 116 of the interior portion 66 through the use of a second attachment mechanism. The mounting flap 112 is optional; the conduit 110 may be attached directly to the mounting surface 116, if desired. The mounting surface 116 may simply be an elongated section of the interior portion 66, extending along the desired path of the inflation channel 90. The second attachment mechanism may comprise mechanical fastening, sewing, weaving, chemical or adhesive bonding, thermal, sonic, or electromagnetic welding, or the like. Depending on the selected attachment mechanism, the mounting surface 116 may or may not require any unique configuration by comparison with the remainder of the interior portion 66.

For example, if the second attachment mechanism comprises sewing or weaving, the mounting surface 116 may not require any unique processing prior to application of the second attachment mechanism. However, if RF welding is utilized as the second attachment mechanism, the mounting surface 116 maybe coated with a urethane-based substance prior to the application of radio frequency energy. The mounting flap 112 may be either constructed of a urethane-based material, or coated with such a material so that the inflation channel 90 and the mounting surface 116 form a urethane-to-urethane interface that can be easily RF welded.

The attachment of the inflation channel 90 within the protection zones 40, 42 of the cushion may serve to ensure that the inflation channel 90 remains in the proper position with respect to the protection zones 40, 42 to ensure substantially uniform inflation. The mounting flap 112 maybe affixed to the mounting surface 116 prior to attachment of the first and second membranes 60, 62.

Such attachment may provide some advantages over fixation of the mounting flap 112 within the outer edges 64. For example, the mounting flap 112 need not be aligned within the outer edges 64 to form a common attachment. Additionally, the use of separate attachment mechanisms for the outer edges 64 and the mounting flap 112 provides flexibility in terms of which attachment mechanisms can be used. More specifically, each attachment mechanism need not be capable of attaching several layers simultaneously, but may simply operate to attach two surfaces together. Thus, the easiest and most economical methods may be selected for the first and second attachment mechanisms.

Additionally, through attachment of the inflation channel 90 within the cushion 10, an airbag manufacturer may manufacture and ship the cushion 10 with the inflation channel already attached. An installer need only connect the gas guide 26, or other structure used to convey gas to the inflation channel 90, and affix the cushion 10 within a vehicle.

The geometry of the gas outlet extension 114 may be selected to restrict "backflow," or motion of inflation gases back into the inflation channel 90 from the interior of the cushion 10. During inflation, the high pressure of inflation gases in the inflation channel 90 may generally drive the inflation gases from the channel 90 and into the protection zones 40, 42. The momentum of the inflation gases flowing into the cushion 10 may also speed distribution of the inflation gases, to the extent that considerable pressure is built up within the protection zones 40, 42, as the gases compress and as the membranes 40, 42 stretch to contain the gases.

Consequently, once the supply of inflation gas has been exhausted, the pressure outside of the channel 90 may exceed that within the channel 90. Additionally, despite the comparatively uniform inflation of the cushion 10, some portions of the cushion 10 may be inflated to a higher pressure than others. Consequently, there maybe a considerable pressure gradient tending to induce further motion of inflation gases within the cushion 10 after inflation.

Such motion of inflation gases may cause pressure oscillation, rippling, and other effects that may degrade performance of the cushion 10. Additionally, under certain circumstances, it may be desirable to inflate one portion of the cushion 10 to a higher pressure than another portion; backflow of inflation gases would tend to undermine any such deliberately created pressure differential.

The configuration of FIG. 3 may help to reduce inflation gas redistribution by restricting backflow of inflation gases through the inflation channel 90. The gas outlet extension 114 shown in FIG. 3 has a generally tapered shape, with an enlarged end 118 in fluid communication with the conduit 110 and a narrow end 120 in which the holes 92 are formed. As a result of the tapered shape, the gas outlet extension 114 may form a substantially pointed interior 122 in communication with the holes 92.

In FIG. 3, inflation is still occurring. Consequently, inflation gases traveling through the conduit 110 are at a comparatively high pressure, as indicated by the arrows 124. Inflation gases outside the conduit 110 are at a comparatively low pressure, as indicated by the arrows 126 outside the conduit 110. The resulting pressure gradient tends to propel inflation gases out of the conduit 110, through the gas outlet extension 114 to provide the gas flows 94. Due to the comparatively high pressure within the conduit 110, the enlarged end 118 of the gas outlet extension 114 remains open to gas flow from the conduit 110.

As the inflator 24 deploys, the inflation gases are injected into the inflation channel with considerable speed and pressure. Accordingly, a shock wave is formed by the expanding gases. In the absence of the inflation channel 90, the shock wave would transfer its energy directly to the membranes 60, 62. The resulting tensile stress may tend to tear the membranes 60, 62, or possibly detach them at the outer edge 64. With the use of the inflation channel 90, the inflation channel 90 receives the inflation stress. Even if there is some rupture of the inflation channel 90, only the operation of the inflation channel 90 is impaired; the membranes 60, 62 are still intact and can thus provide some degree of protection for vehicle occupants.

Figure 4:
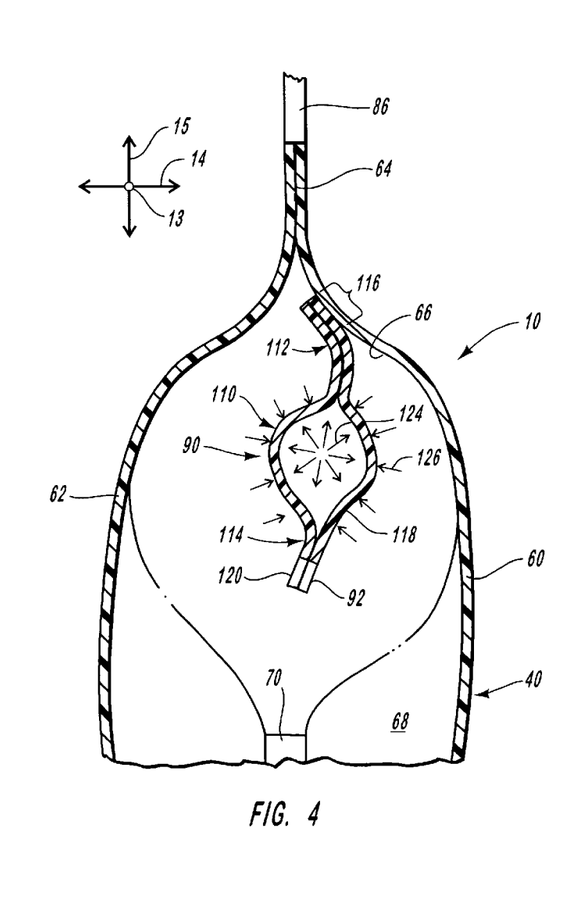
FIG. 4 is a front elevation, section view of the cushion of FIG. 1, showing the inflation channel after inflation of the cushion, in which pressure outside the inflation channel is greater than pressure inside the channel so that the outlet extension closes to block backflow of the inflation gas.

Referring to FIG. 4, the section view of FIG. 3 is shown after inflation has substantially occurred, and the flow of inflation gases into the cushion 10 has dropped considerably. Inflation gases within the conduit 110 still exert a pressure outward, as indicated by the arrows 124. However, inflation gases outside the conduit 110 have reached a pressure sufficient to reverse the gas flows 94 depicted in FIG. 3.

The tapered shape of the gas outlet extension 114 makes the gas outlet extension 114 collapsible. As the substantially pointed interior 122 of the gas outlet extension 114 grows narrower, inflation gases within the gas outlet extension 114 may be driven back into the conduit 110 by the walls of the gas outlet extension 114. The enlarged end 118 can then collapse to restrict gas flow between the conduit 110 and the gas outlet extension 114. Similarly, the holes 92 collapse to restrict gas flow into the holes 92 from outside the inflation channel 90.

Consequently, motion of inflation gases along the length of the cushion 10 is inhibited. Inflation gases may still flow around the inflation channel 90, but with somewhat greater difficulty. If desired, the inflation channel 90 may be enlarged and/or the interior seams 70 may be lengthened to further constrict the flow path for inflation gases outside the inflation channel 90. Similarly, screens, baffles, or the like may also be installed around the inflation channel 90 to further restrict backflow.

Figure 5:
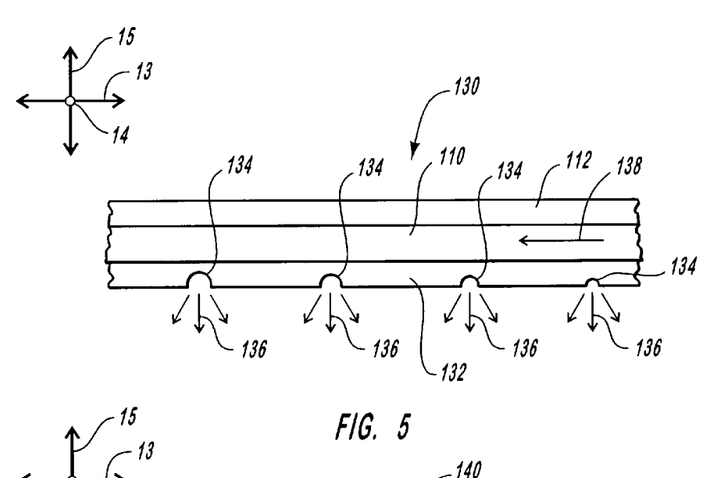
FIG. 5 is side elevation view of a portion of an alternative embodiment of an inflation channel according to the invention, with holes of varying size to provide a substantially even flow rate of inflation gas along the length of the cushion.

Referring to FIG. 5, a side view of a portion of an alternative embodiment of an inflation channel 130 is shown. The inflation channel 130 may be attached within a cushion much as the inflation channel 90 is attached to the mounting surface 116 of the cushion 10. The inflation channel 130 may have a conduit 110 and a mounting flap 112 similar to those depicted in FIGS. 2 through 4. The inflation channel 130 may also have a gas outlet extension 132 in which a plurality of holes 134 are formed. The holes 134 may vary in size to provide a comparatively uniform mass flow rate of inflation gas along the length of the cushion 10.

More specifically, each of the holes 134 may release a gas flow 136. Inflation gases may travel through the inflation channel 130 in a gas flow direction 138. The pressure of the inflation gases within the inflation channel 130 is comparatively greater toward the beginning of the path followed by the inflation gases.

The increased pressure of the inflation gases compensates for the comparatively small size of the first holes 134 encountered by the inflation gases moving in the gas flow direction 138. Similarly, the comparatively large size of the holes 134 encountered by the inflation gases further along the inflation channel 130 compensates for the comparatively low pressure of the inflation gases. As a result, the gas flows 136 are substantially equal in mass flow rate, even though the holes 134 are differently sized.

Figure 6:
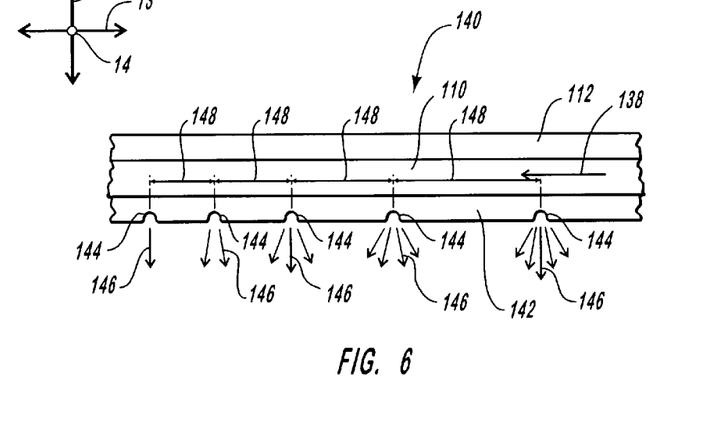
FIG. 6 is a side elevation view of another alternative embodiment of an inflation channel in which holes are separated by varying displacements to provide a substantially even flow rate of inflation gas along the length of the cushion.

Referring to FIG. 6, a portion of an inflation channel 140 according to another embodiment of the invention is depicted. The inflation channel 140 maybe attached within a cushion much as the inflation channel 90 is attached to the mounting surface 116 of the cushion 10. The inflation channel 140 may also have a conduit 110 and a mounting flap 112 similar to those shown and described previously. The inflation channel 140 may also have a gas outlet extension 142 in which a plurality of holes 144 are formed. The holes 144 may be substantially equal in size. However, the holes 144 maybe spaced apart in such a manner as to provide a substantially uniform flow of inflation gases along the length of the cushion 140.

More specifically, each of the holes 144 may release a gas flow 146. The holes 146 are preferably spaced apart by a series of variable displacements 148 that grow shorter along the gas flow direction 138. As mentioned above, the inflation gases tend to decrease in pressure as they move in the gas flow direction 138.

Consequently, the first holes 144 encountered by the inflation gases may release gas flows 146 with a comparatively larger mass flow rate. However, the increased spacing between the initial holes compensates for the larger mass flow rate of inflation gas released from each hole 144. Conversely, the holes 144 further along the gas flow direction 138 are closer together; their decreased displacements 148 tend to compensate for the fact that a comparatively smaller amount of inflation gas is released from each hole 144. As with the inflation channel 130 of FIG. 5, the result is a substantially uniform flow of inflation gases from the inflation channel 140 along the length of the cushion 10.

Figure 7:
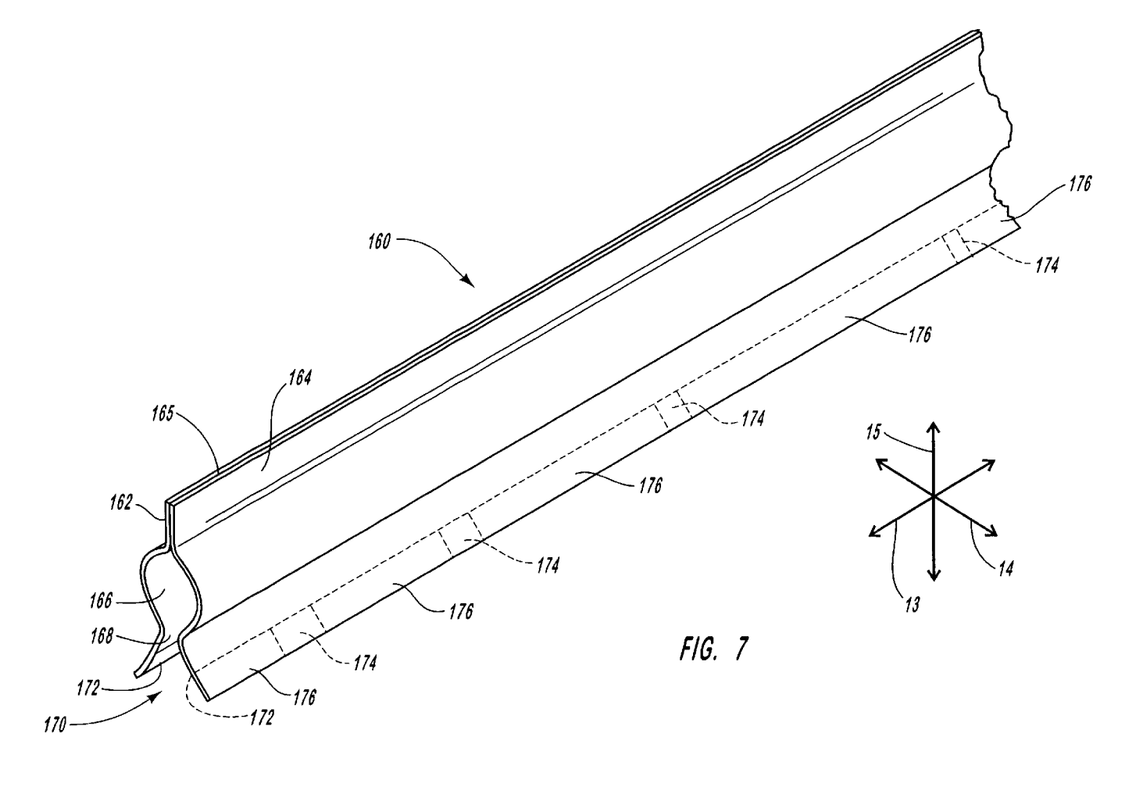
FIG. 7 is a perspective view of one method of manufacturing an inflation channel, including but not limited to those of FIGS. 2 through 6, through the use of a workpiece with a slit selectively closed to provide the gas outlet extension with its associated holes.

Referring to FIG. 7, a perspective view depicts one method of forming an inflation channel with holes. Such a method may be applied to any configuration of the inflation channel and holes, including the inflation channels 90, 130, 140 of FIGS. 2 through 6 and the holes 92, 134, 144 disclosed in conjunction with the inflation channels 90, 130, 140.

A workpiece 160 may first be provided. The workpiece 160 may have a variety of configurations, and maybe created in a variety of different ways. For example, if the second attachment method comprises RF welding, the workpiece 160 may be formed entirely of a urethane-based material. Alternatively, the workpiece 160 may be formed of some other material, such as a fabric, and may be coated at least in part with a urethane-based material. If the second attachment method comprises sewing, weaving, or the like, the use of a workpiece 160 formed of uncoated fabric may be desirable.

If the workpiece 160 is to be constructed of urethane or another polymer, the workpiece 160 may be obtained by extruding the polymeric material in the proper shape. If the workpiece 160 is to be formed of a fabric, conventional fabric shaping and forming techniques may be used. Numerous other manufacturing processes, such as stamping, molding, casting, and the like may also be utilized, depending on the selected material. The workpiece 160 may be formed substantially in the shape of the inflation channel 90, or may be formed with lay flat construction or a similar method and subsequently shaped to form the inflation channel 90.

The workpiece 160 may be formed as one unitary piece, or may be constructed of two separate pieces attached together. For example, as shown in FIG. 7, the workpiece may include a first piece of material 162 and a second piece of material 164 attached together to form a seam 165, positioned at one will become the mounting flap 112 of the inflation channel 90. The first and second pieces of material 162, 164 may be attached together using any of the attachment mechanisms described previously.

The workpiece 160 may have an interior cavity 166 that is accessible in the longitudinal direction 13 through an orifice 168 in the end of the workpiece 160, and accessible in the transverse direction 15 through a slit 170 extending along at least a portion of the workpiece 160. The slit 170 may have attachment surfaces 172 on either side of the slit 170, positioned such that the attachment surfaces 172 can be attached together through the use of a third attachment mechanism to close the slit 170.

If desired, the attachment surfaces 172 may be attached together in their entirety. The holes 92 may then be formed through drilling, punching, cutting, or a similar operation. In the alternative, the attachment surfaces 172 may be intermittently attached to leave the holes 92. For example, sections 174 of the attachment surfaces 172 may first be selected to become the holes 92. The sections 174 may vary in size or spacing, if the workpiece 160 is to become an inflation channel 130 or 140 like those of FIGS. 5 and 6. Then, the portions 176 of the attachment surfaces 172 outside the selected sections 174 may be attached together, leaving the selected sections 174 unattached.

Such selective attachment may be carried out through the use of the third attachment mechanism, which may comprise any of the attachment mechanisms mentioned previously, including mechanical fastening, sewing, weaving, chemical or adhesive bonding, thermal, sonic, or electromagnetic welding, or the like. For example, in the case of adhesive bonding, the adhesive may be applied only to the portions 176 outside the selected sections 174. In the case of RF welding, a urethane coating may be applied only to the portions 176 outside the selected sections 174. In the alternative, a non-RF weldable spacer may be inserted into each of the selected sections 174, and then RF radiation may be applied to the attachment surfaces 172 in their entirety.

Numerous other methods of intermittently attaching the attachment surfaces may be used 172. Such methods may decrease the cost and production time required for formation of the inflation channel 90 because only the attachment operation need be carried out; no drilling, punching, or cutting operation is necessary.

The methods and apparatus of the present invention may enhance the uniformity and overall speed of inflation of airbag cushions, particularly cushions used for inflatable curtain modules. More specifically, the inflation channels 90, 130, 140 may operate to distribute inflation gases in a comparatively even fashion along the length of each protection zone 40, 42 of the cushion 10. Additionally, the inflation channel 90 may effectively absorb inflation stresses, thereby decreasing the likelihood of a failure of the membranes 60, 62 during deployment of the cushion 10.

Furthermore, migration of inflation gases due to backflow may be reduced due to the collapsible design of the gas outlet extension 114. The manufacture of the cushion 10 may be made less expensive and time consuming through the selective attachment of the attachment surfaces 172 to form holes 92, 134, or 144 in the inflation channel 90, 130, or 140. Additionally, the installation of the cushion 10 may be simplified by the attachment of the inflation channel 90, 130, or 140 to a mounting surface 116 enclosed by the protection zones 40, 42.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A cushion for an inflatable curtain module for protecting an occupant of a vehicle from lateral impact, the cushion comprising:

a first membrane having an interior portion and an outer edge, the interior portion having a mounting surface extending longitudinally along the interior portion;

a second membrane having an interior portion and an outer edge, the outer edges of the first and second membranes being attachable to form at least one inflatable protection zone between the interior portions of the first and second membranes; and an inflation channel configured to receive pressurized gas from a source of pressurized gas, the inflation channel having a plurality of holes formed therein to permit pressurized gas to escape from the inflation channel into the protection zone, wherein the inflation channel is configured to be attached to the mounting surface such that the protection zone encloses at least a portion of a length of the inflation channel in a longitudinal direction, the inflation channel comprising a conduit configured to direct a flow of pressurized gas along a length of the conduit, a gas outlet extension affixed to the conduit and extending along at least a portion of the length of the conduit, the gas outlet extension having a plurality of holes, wherein the gas outlet extension is configured to receive pressurized gas from the conduit and to disperse the pressurized gas within the cushion via the holes, and wherein the gas outlet extension has a tapered shape selected to substantially prevent pressurized gas from re-entering the conduit through the holes.

2. The cushion of claim 1, wherein the first and second membranes are attached together via a first attachment mechanism, and wherein the first membrane and the inflation channel are attached together via a second attachment mechanism.

3. The cushion of claim 2, wherein the first attachment mechanism is mechanical fastening, sewing, weaving, chemical bonding, adhesive bonding, thermal welding, sonic welding, or electromagnetic welding, and wherein the second attachment mechanism is a type different from the first attachment mechanism.

4. The cushion of claim 2, wherein the inflation channel is constructed substantially of a urethane-based material, and wherein the first membrane comprises a urethane-based coating on the mounting surface of the first membrane, and wherein the second attachment mechanism comprises RF welding the inflation channel to the mounting surface.

5. The cushion of claim 2, wherein the inflation channel is constructed substantially of a fabric, the inflation channel further comprising a urethane-coated portion, and wherein the first membrane comprises a urethane-based coating on the mounting surface of the first membrane, and wherein the second attachment mechanism comprises RF welding the urethane-coated portion of the inflation channel to the mounting surface.

6. The cushion of claim 2, wherein the second attachment mechanism comprises sewing.

7. The cushion of claim 1, wherein the holes comprise a plurality of sizes selected to provide a substantially uniform mass flow rate of pressurized gas flowing into the protection zone along the length of the protection zone when the source of pressurized gas is activated.

8. The cushion of claim 1, wherein the holes are spaced apart by a plurality of displacements selected to provide a substantially uniform mass flow rate of pressurized gas flowing into the protection zone along the length of the protection zone when the source of pressurized gas is activated.

9. A cushion as in claim 1 wherein the gas outlet extension forms a substantially pointed interior in communication with the holes.

10. The cushion of claim 1, wherein the inflation channel comprises two attachment surfaces along the length of the inflation channel, the attachment surfaces being attached together via a third attachment mechanism applied exclusive of the holes.

11. A cushion as in claim 1 wherein the gas outlet extension is collapsible.

12. A method of manufacturing a cushion for an inflatable curtain module for protecting an occupant of a vehicle from lateral impact, the method comprising:

provide a first membrane having an interior portion and an outer edge, the interior portion having a mounting surface extending longitudinally along the interior portion;

providing a second membrane having an interior portion and an outer edge;

providing an inflation channel configured to receive pressurized gas from a source of pressurized gas, the inflation channel having a plurality of holes along a length of the inflation channel in a longitudinal direction to permit escape of the pressurized gas;

attaching the inflation channel to the mounting surface; and attaching the outer edge of the first membrane to the outer edge of the second membrane to form at least one inflatable protection zone between the interior portions of the first and second membranes, the protection zone enclosing at least a portion of the length of the inflation channel, wherein the cushion is further constructed such that the inflatable channel is not attached to the second membrane.

13. The method of claim 12, wherein attaching the outer edge of the first membrane to the outer edge of the second membrane comprises applying a first attachment mechanism to the outer edges, and wherein attaching the inflation channel to the mounting surface comprises applying a second attachment mechanism to the mounting surface and the inflation channel.

14. The method of claim 13, wherein the first attachment mechanism is selected from the group consisting of mechanical fastening, sewing, weaving, chemical bonding, adhesive bonding, thermal welding, sonic welding, and electromagnetic welding, and wherein the second attachment mechanism is a type different from the first attachment mechanism.

15. The method of claim 12, wherein the inflation channel is constructed substantially of a urethane-based material, the first membrane comprising a urethane-based coating on the mounting surface, and wherein attaching the inflation channel to the mounting surface comprises RF welding the inflation channel to the mounting surface.

16. The method of claim 12, wherein the inflation channel is constructed substantially of a fabric, the fabric having a urethane-coated portion, the first membrane comprising a urethane-based coating on the mounting surface, and wherein attaching the inflation channel to the mounting surface comprises RF welding the urethane-coated portion of the inflation channel to the mounting surface.

17. The method of claim 12, wherein attaching the inflation channel to the mounting portion comprises sewing the inflation channel to the mounting portion.

18. A method of manufacturing a cushion for an inflatable curtain module for protecting an occupant of a vehicle from lateral impact, the method comprising:

providing a first membrane having an interior portion and an outer edge, the interior portion having a mounting surface extending longitudinally along the interior portion;

providing a second membrane having an interior portion and an outer edge;

providing an inflation channel configured to receive pressurized gas from a source of pressurized gas, the inflation channel having a plurality of holes along a length of the inflation channel in a longitudinal direction to permit escape of the pressurized gas;

attaching the inflation channel to the mounting surface; and attaching the outer edge of the first membrane to the outer edge of the second membrane to form at least one inflatable protection zone between the interior portions of the first and second membranes, the protection zone enclosing at least a portion of the length of the inflation channel, wherein the inflation channel comprises a conduit configured to direct a flow of pressurized gas along a length of the conduit, a gas outlet extension affixed to the conduit and extending along at least a portion of the length of the conduit, the gas outlet extension having a plurality of holes, wherein the gas outlet extension is configured to receive pressurized gas from the conduit and to disperse the pressurized gas within the cushion via the holes, and wherein the gas outlet extension has a tapered shape selected to substantially prevent pressurized gas from re-entering the conduit through the holes.

19. The method of claim 18, wherein attaching the outer edge of the first membrane to the outer edge of the second membrane comprises applying a first attachment mechanism to the outer edges, and wherein attaching the inflation channel to the mounting surface comprises applying a second attachment mechanism to the mounting surface and the inflation channel.

20. The method of claim 19, wherein the first attachment mechanism is mechanical fastening, sewing, weaving, chemical bonding, adhesive bonding, thermal welding, sonic welding, or electromagnetic welding, and wherein the second attachment mechanism is a type different from the first attachment mechanism.

21. The method of claim 18, wherein the inflation channel is constructed substantially of a urethane-based material, the first membrane comprising a urethane-based coating on the mounting surface, and wherein attaching the inflation channel to the mounting surface comprises RF welding the inflation channel to the mounting surface.

22. The method of claim 18, wherein the inflation channel is constructed substantially of a fabric, the fabric having a urethane-coated portion, the first membrane comprising a urethane-based coating on the mounting surface, and wherein attaching the inflation channel to the mounting surface comprises RF welding the urethane-coated portion of the inflation channel to the mounting surface.

23. The method of claim 18, wherein attaching the inflation channel to the mounting portion comprises sewing the inflation channel to the mounting portion.

24. A cushion for an inflatable curtain module for protecting an occupant of a vehicle from lateral impact, the cushion comprising:

a first membrane having an interior portion and an outer edge, the interior portion having a mounting surface extending longitudinally along the interior portion;

a second membrane having an interior portion and an outer edge, the outer edges of the first and second membranes being attachable to form at least one inflatable protection zone between the interior portions of the first and second membranes; and an inflation channel to receive pressurized gas from a source of pressurized gas, the inflation channel having a plurality of holes formed therein to permit pressurized gas to escape from the inflation channel into the protection zone, wherein the inflation channel is attached to the mounting surface such that the protection zone encloses at least a portion of a length of the inflation channel in a longitudinal direction, the cushion being further configured such that the inflation channel is not attached to the second membrane.

25. The cushion of claim 24, wherein the first and second membranes are attached together via a first attachment mechanism, and wherein the first membrane and the inflation channel are attached together via a second attachment mechanism.

26. The cushion of claim 25, wherein the first attachment mechanism is mechanical fastening, sewing, weaving, chemical bonding, adhesive bonding, thermal welding, sonic welding, or electromagnetic welding, and wherein the second attachment mechanism is a type different from the first attachment mechanism.

27. The cushion of claim 25, wherein the inflation channel is constructed substantially of a urethane-based material, and wherein the first membrane comprises a urethane-based coating on the mounting surface of the first membrane, and wherein the second attachment mechanism comprises RF welding the inflation channel to the mounting surface.

28. The cushion of claim 25, wherein the inflation channel is constructed substantially of a fabric, the inflation channel further comprising a urethane-coated portion, and wherein the first membrane comprises a urethane-based coating on the mounting surface of the first membrane, and wherein the second attachment mechanism comprises RF welding the urethane-coated portion of the inflation channel to the mounting surface.

29. The cushion of claim 25, wherein the second attachment mechanism comprises sewing.

30. The cushion of claim 24, wherein the holes comprise a plurality of sizes selected to provide a substantially uniform mass flow rate of pressurized gas flowing into the protection zone along the length of the protection zone when the source of pressurized gas is activated.

31. The cushion of claim 24, wherein the holes are spaced apart by a plurality of displacements selected to provide a substantially uniform mass flow rate of pressurized gas flowing into the protection zone along the length of the protection zone when the source of pressurized gas is activated.

32. The cushion of claim 24, wherein the inflation channel comprises:
    a conduit configured to direct a flow of pressurized gas along a length of the conduit;
    a gas outlet extension affixed to the conduit and extending along at least a portion of the length of the conduit, the gas outlet extension having a plurality of holes, wherein the gas outlet extension is configured to receive pressurized gas from the conduit and to disperse the pressurized gas within the cushion via the holes; and
    wherein the gas outlet has a tapered shape selected to substantially prevent pressurized gas from re-entering the conduit through the holes.

33. The cushion of claim 24, wherein the inflation channel comprises two attachment surfaces along the length of the inflation channel, the attachment surfaces being attached together via a third attachment mechanism applied exclusive of the holes.

34. A cushion for an inflatable curtain module for protecting an occupant of a vehicle from lateral impact, the cushion comprising:
    a first membrane having an interior portion and an outer edge, the interior portion having a mounting surface extending longitudinally along the interior portion;
    a second membrane having an interior portion and an outer edge, the outer edges of the first and second membranes being attachable to form two or more inflatable protection zones between the interior portions of the first and second membranes; and
    an inflation channel to receive pressurized gas from a source of pressurized gas, the inflation channel having a plurality of holes formed therein to permit pressurized gas to escape from the inflation channel into the protection zone, wherein the inflation channel is attached to the mounting surface such that at least one of the protection zones encloses at least a portion of a length of the inflation channel in a longitudinal direction, the cushion further comprising a connection zone to permit communication of inflation gases between the protection zones, the cushion being further configured such that the inflation channel is not attached to the second membrane.

35. A cushion as in claim 34 wherein the connection zone is configured to attach the protection zones.

36. A cushion as in claim 34 wherein the connection zone is not configured to provide impact protection.

37. A cushion as in claim 34 wherein the connection zone includes a transfer port.

38. A cushion as in claim 37 wherein the connection zone permits communication of inflation gases between the protection zones through the transfer port.

39. A cushion as in claim 37 wherein the transfer port is in communication with one or more connection chambers.

40. A cushion as in claim 34 wherein the connection zone includes flexible portions.

41. A cushion as in claim 40 wherein the connection chambers are connected together and connected to the protection zones through the flexible portions.

* * * * *